March 26, 1963 C. H. PERKINS 3,082,626
THERMALLY RESPONSIVE DEVICE
Filed Dec. 5, 1958
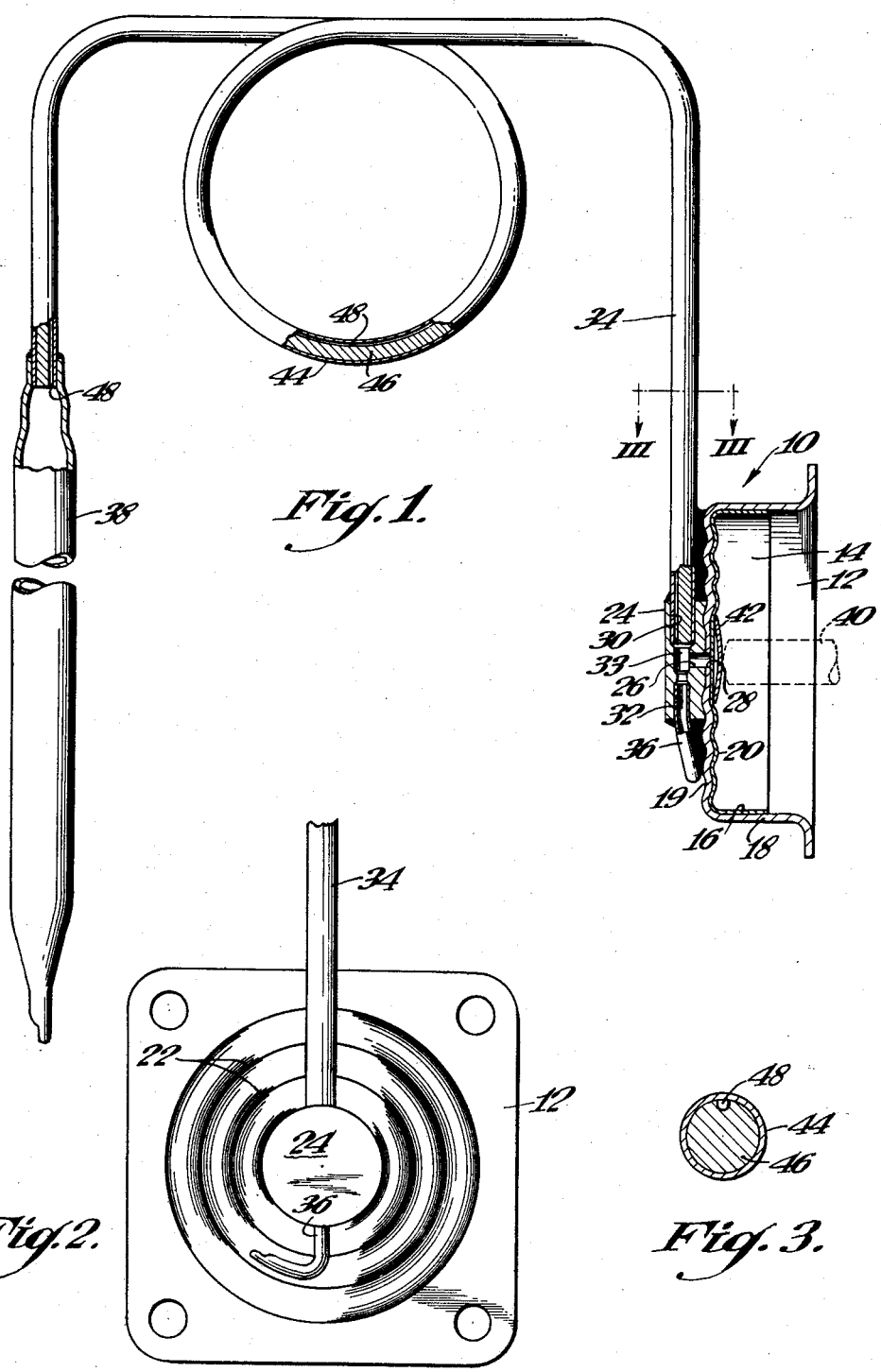

United States Patent Office 3,082,626
Patented Mar. 26, 1963

3,082,626
THERMALLY RESPONSIVE DEVICE
Charles H. Perkins, Knoxville, Tenn., assignor to Robertshaw-Fulton Controls Company, Richmond, Va., a corporation of Delaware
Filed Dec. 5, 1958, Ser. No. 778,455
7 Claims. (Cl. 73—368.4)

This invention relates to thermally responsive devices and more particularly to thermally responsive devices of the hydraulic type used for regulating or indicating temperatures.

Devices of this character generally include an expansible element which may be connected to a control device requiring temperature responsive movement, a temperature sensing bulb and a length of capillary tubing connecting the temperature sensing bulb to the expansible element. The temperature sensing bulb, the capillary tubing and the expansible element constitute a closed system which is filled with a temperature sensitive fluid.

In a typical application of such a system, the temperature sensing bulb may be positioned to be responsive to the temperature variations of a condition and the expansible element may be connected to a control device. Should the temperature of the temperature sensing bulb increase, the temperature of the fluid therein also increases whereby an increase in the volume of the fluid results. Since the expansible element is the only element in the system with a readily variable volume, the increase in volume of fluid within the bulb is transmitted through the fluid in the capillary tube to cause expansion of the expansible element which, in turn, causes movement of the control device. A decrease in the bulb temperature will cause the expansible element to contract resulting in movement of the control device in an opposite direction.

In ordinary cases, this type of thermally responsive device is capable of accurate temperature indication. However, in some cases the ambient temperature of the expansible element and the capillary tube will materially affect the accuracy of the thermally responsive device. For example, where these devices are used to operate a control for a domestic range, the temperature sensing bulb may be located in the oven while the expansible element and a portion of the capillary tube may be located a substantial distance from the oven. In this application, variations of the ambient temperature of the expansible element or the capillary tube may be sufficient to prevent accurate operation of the range control. A rise in the ambient temperature of the expansible element will cause the fluid therein to expand whereby an expansive movement of the expansible element will result which may operate the range control to a closed position before the desired oven temperature is attained. A fall in the ambient temperature of the expansible element will cause opposite effect. Likewise, the rise or fall of the ambient temperature of the capillary tube may cause undesirable expansion or contraction of the thermal fluid to produce inaccurate expansible element movement.

It is an object of this invention to compensate for the effect of the ambient temperature variations of both the capillary tube and the expansible element in a device of the indicated type.

Another object of this invention is to combine, in an ambient temperature compensated thermal system, a self-compensating capillary tube and a self-compensating expansible control element.

Another object of this invention is to construct a durable self-compensating thermal system of the indicated type with a minimum number of parts which will render it economical to manufacture.

In a preferred embodiment of the invention, the hydraulic expansible element has a temperature compensating bimetallic means secured thereto and the capillary tube is constructed of a sheath having a relatively large coefficient of expansion and a core having a relatively low coefficient of expansion. The temperature responsive means of the bimetallic means are in the opposite direction to the corresponding movement of the expansible element, whereby the expansible element is compensated for ambient temperature variations. The walls of the core and sheath are of a different configuration so that a space is defined therebetween for a volume of temperature sensitive fluid. The differential expansion between the sheath and the core of the capillary tube changes the internal volume of the capillary tube as the ambient temperature varies. The capillary tube is designed to compensate for the volume changes of the temperature sensitive fluid in response to ambient temperature variations. Hence, it will be apparent that both the capillary tube and expansible element are constructed to compensate for the effect of ambient temperature variations.

Other objects and advantages of the invention will become apparent from the following description taken in connection with the accompanying drawings wherein:

FIG. 1 is an elevational view, partly in section, of a preferred embodiment of the invention;

FIG. 2 is an elevational view of a detail of the embodiment shown in FIG. 1; and FIG. 3 is a sectional view taken on lines III—III of FIG. 1.

Referring now more particularly to FIG. 1, the expansible control element is indicated generally at 10 and comprises a cup-shaped outer member 12 and a cup-shaped flexible diaphragm member 14 nested within outer member 12. Outer member 12 and diaphragm member 14 are both constructed of stainless steel or another suitable material. The wall 16 of diaphragm member 14 is fixedly secured to the wall 18 of outer member 12 by a suitable fastening means. The cooperating base portions 19 and 20 of outer member 12 and diaphragm member 14, respectively, have a plurality of corresponding annular corrugations 22 formed in concentric relation. By thus corrugating and nesting the outer member 12 and the diaphragm member 14, it is possible to reduce the internal volume of expansible control element 10 to a minimum.

A cylindrical spud member 24 is fixedly secured to base 19 of outer member 12 by a suitable fastening means. Spud member 24 has an axial central bore 26 which communicates with a central bore 28 in base 19 of outer member 12. Spud member 24 also has a pair of transverse bores 30 and 32 communicating with central bore 26 to define a reservoir 33 in spud member 24. Bore 30 is adapted to receive one end of the capillary tube 34 which is secured to the spud member 24 and base portion 19 of outer member 12. Bore 32 is adapted to receive one end of a filling capillary tube 36 which is secured to spud member 24 and base portion 19 and has its opposite end closed and sealed after the filling operation. The opposite end of capillary tube 34 is connected to the interior of a hollow temperature sensing bulb 38 which may be positioned in the space where the temperature is to be controlled.

Temperature sensing bulb 38, capillary tubes 34 and 36, and reservoir 33 are all filled with a temperature sensitive fluid which may vary in volume in response to temperature changes to form a closed fluid system. It will thus be apparent that when the fluid in temperature sensing bulb 38 is heated, the fluid volume increases and fluid is forced out of reservoir 33 into the space between the cooperating base portions 19 and 20. As diaphragm member 14 is more flexible than outer member 12, it will be moved to the right, as viewed in FIG. 1, by the fluid entering the space between base portions 19 and 20. This movement of diaphragm member 14 may be utilized to actuate any suitable control device operating element 40 which engages a bimetallic disc 42 secured to base portion 20 of diaphragm member 14.

Disc 42 serves as a compensating means for the ambient temperature variations of the expansible control element 10. Disc 42 is secured to base 20 of diaphragm member 14 by a flexible adhesive so that it is dished outwardly from base 20 and it is constructed to flatten in response to increasing temperatures and to bow outwardly in response to decreasing temperatures. It will thus be apparent that while an increase in the ambient temperature of the expansible control element 10 will cause the fluid therein to expand thereby moving diaphragm 14 to the right, as viewed in FIG. 1, this increase in ambient temperature will also cause disc 48 to flatten whereby its point of contact with operating element 40 will be moved to the left. Hence, the disc movement tends to compensate for the diaphragm movement in response to ambient temperature variations. Disc 42 is designed in accordance with the diaphragm movement and the volume of the temperature sensitive fluid to exactly compensate for ambient temperature variations when the diaphragm has completed half of its available stroke.

Capillary tube 34 is also constructed to compensate for the ambient temperature variations thereof. To this end, capillary tube 34 comprises a sheath 44 of a material having a relatively large coefficient of thermal expansion, such as copper. The sheath 44 is drawn over a core 46 of material having a relatively low coefficient of thermal expansion such as Invar. As best shown in FIG. 3, core 46 is provided with a longitudinal groove 48 to insure a uniform continuous path for liquid flow through capillary tube 34.

It will be apparent that a differential expansion between sheath 44 and core 46 will change the internal volume of capillary tube 34 in response to ambient temperature variations. Capillary tube 34 is constructed to compensate for the volume changes of the temperature sensitive fluid in response to ambient temperature variations by the proper design of longitudinal groove 48 and the annular clearance between sheath 44 and core 46. The compensation characteristics of capillary tube 34 may be adjusted for temperature sensitive fluids having various coefficients of thermal expansion by changing the annular clearance during the manufacturing operation.

It will thus be apparent that the thermally responsive device is effectively compensated for ambient temperature variations at both the capillary tube 34 and the expansible control element 10.

It is to be understood that although only one embodiment of this invention has been shown and described, the invention can be variously embodied and changes may be made in the construction and arrangement of parts without departing from the scope of the invention as defined by the appended claims.

I claim:
1. A thermally responsive control device comprising a hollow temperature sensing means, a control element having a fixed wall and a movable wall defining an internal chamber therebetween, a capillary tube interconnecting the interior of said temperature sensing means and said internal chamber of said control element, a temperature sensitive fluid filling said temperature sensing means, said internal chamber and said capillary tube, said movable wall being movable in response to expansion and contraction of said fluid, said capillary tube being constructed and arranged to compensate for the ambient temperature variations thereof, and means directly secured to said movable wall externally of said chamber and being movable inwardly relative to said movable wall in response to an increase in ambient temperature and outwardly relative to said movable wall in response to a decrease in ambient temperature to compensate for the movement of said movable wall caused by the ambient temperature variations thereof.

2. In a thermally responsive control device, the combination comprising a hollow thermal sensing bulb, a control element having opposed fixed and movable walls defining an expansible chamber therebetween, a capillary tube interconnecting the interior of said bulb and said expansible chamber, means disposed in said capillary tube to compensate for ambient temperature variations, a thermally responsive fluid filling said bulb, said tube and said chamber and causing movement of said movable wall in response to temperature variations sensed by said bulb, and bimetallic flexing means secured directly to said movable wall externally of said chamber and being actuated inwardly with respect to said movable wall in response to an increase in ambient temperature and outwardly with respect to said movable wall in response to a decrease in ambient temperature to compensate for the movement of said movable wall caused by ambient temperature variations.

3. In a thermally responsive control device, the combination comprising a hollow thermal sensing bulb, a control element having opposed fixed and movable walls defining an expansible chamber therebetween, a capillary tube interconnecting the interior of said bulb and said expansible chamber, means disposed in said capillary tube and having a coefficient of thermal expansion different from said tube to compensate for ambient temperature variations, a thermally responsive fluid filling said bulb, said tube and said chamber and causing movement of said movable wall in response to temperature variations sensed by said bulb, and bimetallic flexing disc means secured directly to said movable wall externally of said chamber and being actuated inwardly with respect to said movable wall in response to an increase in ambient temperature and outwardly with respect to said movable wall in response to a decrease in ambient temperature to compensate for the movement of said movable wall caused by ambient temperature variations.

4. In a thermally responsive control device, the combination comprising a hollow thermal sensing bulb, a control element having opposed fixed and movable walls defining an expansible chamber therebetween, said walls having the same coefficient of thermal expansion to preclude relative movement therebetween in response to ambient temperature variations, a capillary tube interconnecting the interior of said bulb and said expansible chamber, core means disposed in said capillary tube throughout its length and having a lower coefficient of thermal expansion than said tube to compensate for ambient temperature variations, a thermally responsive fluid filling said bulb, said tube and said chamber and causing movement of said movable wall in response to temperature variations sensed by said bulb, and a bimetallic flexing disc element secured directly to said movable wall externally of said chamber and being movable inwardly with respect to said movable wall in response to an increase in ambient temperature and outwardly with respect to said movable wall in response to a decrease in ambient temperature to compensate for the movement of said movable wall caused by ambient temperature variations.

5. In a thermally responsive control device including an operating element, the combination comprising a hollow thermal sensing bulb, a control element including a cup-shaped member and a flexible diaphragm movable relative thereto to define an expansible chamber therebetween, said member and said diaphragm having substantially the same coefficient of thermal expansion to preclude relative movement therebetween in response to ambient temperature variations, a capillary tube interconnecting the interior of said bulb and said expansible chamber, a core disposed in said capillary tube throughout its length and having a lower coefficient of thermal expansion than said tube to compensate for ambient temperature variations, a thermally responsive fluid filling said bulb, said tube and said chamber and causing movement of said diaphragm in response to temperature variations sensed by said bulb, and a bimetal disc secured directly to said diaphragm and externally of said chamber adapted to engage said operating element being flexed inwardly with respect to said flexible diaphragm in response to an increase in ambient temperature and outwardly with respect to said flexible diaphragm in response to a decrease in ambient temperature to compensate for the movement of said diaphragm caused by ambient temperature variations.

6. A thermally responsive device comprising in combination: a fluid filled expansion chamber having a movable wall; an operating element responsive to movement of said movable wall; and a bimetallic flexing means having a periphery thereof flexibly secured to said movable wall and having a central portion thereof interposed between the end of said operating element and the outer surface of said movable wall, said bimetallic flexing means being so constructed as to move inwardly relative to said movable wall in response to an increase in ambient temperature and outwardly relative to said movable wall in response to a decrease in ambient temperature to compensate for movement of said movable wall caused by variations in ambient temperature.

7. A thermally responsive device comprising in combination: a fluid filled expansion chamber having a movable wall; an operating element responsive to movement of said flexible wall; and a bimetallic cup-shaped disc attached to the outer surface of said movable wall, said bimetalllic cup-shaped disc having the central portion thereof interposed between the end of said operating element and said movable wall, said bimetallic cup-shaped disc being so constructed as to move inwardly relative to said movable wall in response to an increase in ambient temperature and outwardly relative to said movable wall in response to a decrease in ambient temperature to compensate for movement of said movable wall caused by variations in ambient temperature.

References Cited in the file of this patent

UNITED STATES PATENTS

| | | |
|---|---|---|
| 1,827,766 | Rosenburgh | Oct. 20, 1931 |
| 1,995,385 | Foote | Mar. 26, 1935 |
| 2,101,735 | Fonseca | Dec. 7, 1937 |
| 2,235,110 | Oltley | Mar. 18, 1941 |
| 2,252,946 | Persons | Aug. 19, 1941 |
| 2,392,943 | Persons | Jan. 15, 1946 |
| 2,422,365 | Osborn | June 17, 1947 |
| 2,453,851 | Miller | Nov. 16, 1948 |
| 2,546,571 | Watson | Mar. 27, 1951 |